United States Patent [19]

Solhjell

[11] Patent Number: 5,392,170
[45] Date of Patent: Feb. 21, 1995

[54] MAGNETIC TAPE STORAGE UNIT WITH IMPROVED ABILITY TO READ DATA BY USING A SET OF MULTIPLE READ ELEMENTS

[75] Inventor: Erik Solhjell, Oslo, Norway

[73] Assignee: Tandberg Data A/S, Oslo, Norway

[21] Appl. No.: 949,448

[22] Filed: Sep. 22, 1992

[51] Int. Cl.⁶ .................... G11B 15/12; G11B 5/09
[52] U.S. Cl. ...................... 360/63; 360/61; 360/53
[58] Field of Search .............. 360/53, 61, 63, 121, 360/47, 22, 23

[56] References Cited

U.S. PATENT DOCUMENTS

| | | | |
|---|---|---|---|
| 2,628,346 | 2/1953 | Burkhart | 340/174 |
| 3,761,903 | 9/1973 | Bird, Jr. et al. | 360/53 |
| 3,769,465 | 10/1973 | Wellbrock | 360/63 |
| 4,302,783 | 11/1981 | Mima et al. | 360/47 |

FOREIGN PATENT DOCUMENTS

| | | |
|---|---|---|
| 0430265 | 11/1990 | European Pat. Off. . |
| 0430613 | 11/1990 | European Pat. Off. . |
| 1478339 | 6/1977 | United Kingdom ............ 360/77.01 |

OTHER PUBLICATIONS

Patent Abstracts of Japan, vol. 5, No. 115 (P-72) (787) Jul. 24, 1981 (Japanese Application 56054625).
Patent Abstracts of Japan, vol. 5, No. 115, (P-72) (787) Jul. 24, 1981 (Japanese Application 56054631).

*Primary Examiner*—John Shepperd
*Assistant Examiner*—Thomas N. Forbus, Jr.
*Attorney, Agent, or Firm*—Hill, Steadman & Simpson

[57] ABSTRACT

A method and apparatus for reading data contained in blocks arranged in a number of tracks on a storage medium, wherein movement of the storage medium causes the tracks to deviate from a nominal path, are disclosed. In the method and apparatus, a set of multiple read elements is disposed relative to the storage medium so that each of the read elements covers at least a portion of the expected area in which a track to be read will be found, given movement of the storage medium. Each of the read elements has a read channel uniquely associated therewith, and all of the read elements are used simultaneously to read the data blocks. The read channels are monitored, and a first arriving, correctly read block is selected from among the channels, the selected block being the next block in a sequence, following a previously selected block. The data blocks are then stored at memory locations correlated to their position in the sequence on the storage medium.

16 Claims, 4 Drawing Sheets

READING OF BLOCK N+1
TRANSFER TO MAIN BUFFER OF BLOCK N:

READING OF BLOCK N+2
TRANSFER TO MAIN BUFFER OF BLOCK N+1:

MAGNETIC TAPE STORAGE UNIT WITH IMPROVED ABILITY TO READ DATA BY USING A SET OF MULTIPLE READ ELEMENTS

BACKGROUND OF THE INVENTION

1. Field of the Invention

The present invention is directed to a magnetic storage unit with improved ability to read data.

2. Description of the Prior Art

In magnetic data storage devices such as disk and tape drives, one way to increase capacity is to increase the numbers of recorded tracks. Both disk and tape drives have seen a dramatic increase in the number of recorded tracks (often measured as the number of tracks recorded per inch of the media) during the last 20 years. Although capacity also has been increased by other ways, such as an increase in linear bit density and/or in the method of data encoding, the drive designers very often prefer an increase in track density, because the reduction in, for example, signal-to-noise ratio (S/N) is less severe than compared with the same S/N reduction experienced, for example, if the linear density, is increased.

However, increasing the track density may be difficult if the tolerances of the magnetic system and the drive itself are such that during a read back operation the read head cannot follow the recorded track. For example in a disk drive, the recorded track may not follow an exact circle as the disk spins around. Due to imperfections for example in the spindle motor or mechanical design of the spindle mounting, the disk may wobble. The recorded track will therefore not follow an exact circle, but a path which wobbles (very, often with a motion resembling a sinus curve) around the ideal circle track.

FIG. 1 shows a part of the ideal track path (drawn as a straight line) and a dotted line which shows the actual path of the recorded track during subsequent read operations.

The same problem of track position tolerance occurs for tape drives. For example, for longitudinal recorded tracks, wherein each track is recorded in the direction of the moving tape, the track will not follow the exact path during a later read operation as it did during the write operation. Again, it will typically follow a curve which varies around the originally, recorded track. Part of the reason for this behavior is the fact that the tape position typically is controlled by two or more tape guides, and there is often a small amount of play between the edges of the tape and the guides. Additionally, as the tape passes over the head, it has normally no guiding and may "float" slightly away from the nominal correct position.

Therefore, the track density, cannot be increased beyond certain limits which at least partly are determined by the media itself, and partly by the mechanical design and limitations of the drive, unless some methods for improvements are introduced to reduce this position variations. In disk drives, one very, common method has been to use an embedded servo system. Although the actual implementation may vary, the basic principle is that the disk contains prerecorded information (either on a separate disk platter or combined with the data area). This servo information is read by the disk drive as the disk is spinning and is used to correct for any small, rapid deviations from the correct position. Often a solenoid is used to quickly move the head to the correct position.

With this method, the read head when reading data from the disk will typically still follow a curve centering around the original recorded track, however, the deviation from the original curve is reduced and the read head is therefore able to read back the data.

Helical scan tape drives (like video drives) often utilize a different servo principle wherein deviations from the correct position are read by the drive, which in turn increases or decreases the tape speed slightly until the read head is exactly back on track.

Longitudinal recording tape drives such as ¼" cartridge tape drives (often referred to as QIC drives) have mainly relied on mechanical improvements in the tape cartridge or the drive itself in order to increase the number of tracks. However, systems using tapes with special prerecorded servo information are now being introduced. The drive will have specially designed heads with several channels. Each channel has a certain distance from the other channels. During write or read operations, one of the channels will follow one of a set of prerecorded servo information tracks while the other channels will write or read data. The channel used to detect the servo track information will use this information to determine if the head is correctly following the servo track. If not, the information from the servo head will be used by the drive to reposition the head to the correct position. Many methods may be used for this repositioning operation, including the use of a small solenoid or a fast stepper motor.

FIG. 2 shows the front of a typical QIC drive head designed to follow such a servo operation. It has three channels, each with two read elements RA, RB, RC and one write element WA, WB, WC, where alternately one of the channels at a time is used to follow a servo track while either one or two of the other channels are used for recording or reading. The servo information is normally prerecorded on the tape at the time of manufacturing.

Therefore, as described above, the number of recorded tracks may be increased by the use of a servo system to correct for the small variations which will happen in any kind of system. However, to increase the number of tracks further, the complexity of the servo systems very often increases drastically. Also, in many applications, the cost and/or power requirements for a servo system are not acceptable.

SUMMARY OF THE INVENTION

It is an object of the present invention to provide a method and apparatus which will allow an increase in track density without using a servo system. The method and apparatus may, also be used together with a servo system to enable even higher track densities without a need for a more sophisticated servo design.

The invention will be described based upon use with longitudinal recorded tapes; however, it is also suitable for use with other magnetic recording devices such as helical scan (video) tape recorders and magnetic disks. It may, also be suitable for use with optical disk systems.

The basic concept of the invention is to overcome the problem of the read head sometimes not being exactly, positioned over the recorded tracks by having a set of read heads in slightly different positions relative to each other, each attempting to read the track. The information read from each individual read head is sent to a logic unit to determine if the information read is the desired information (i.e., a data block having the next address in a sequence following the most recently read address). If so, it is used by the electronic unit in the normal way. Information not being correct is simply disregarded.

Before describing the details, it is also important to mention that the invention is based upon the factually supported assumption that the actual track position cannot change too rapidly. It will always take a certain time of tape or disk running for a track to be read to move between one off center track position to the other (opposite) off center position. In many cases, including tape or disk drives, the frequency of the changes depends on the specific recording media and drive related items such as reel size and tape speed (or disk size and disk speed). For example, in a ¼" cartridge tape drive, tests have shown that the dynamic variation of the instantaneous track position can be described fairly closely by the sum of a group of sinus waves with different amplitudes and frequencies. For the most common speed and cartridge types, the lowest sinus frequency is typically in the order of 10–50 Hz and the highest frequency around 200–400 Hz. However, the .dominant frequency, range is typically less than 100–120 Hz.

For other media and drives, the frequency, and amplitude pattern will vary; however the invention is based on the perception that the pattern to a great extent is predictable and repeatable.

The invention is also based on the fact that for almost all kinds of data recording, the data are divided into small groups or blocks before recording. Typically, each group can be recognized by some sort of address or block number, and each block of data normally also has special characters used to determine if the data block has been read correctly, (CRC). Additionally, for many applications, data blocks are grouped into frames. This is shown in FIG. 3, which shows the layout of the QIC-2GB tape format.

In the QIC-2GB standard, data is recorded sequentially in blocks along each track, one track at the time. As shown in FIG. 3, each block contains special information like block address bytes, control (CRC) bytes etc. in addition to the data bytes.

Groups of blocks are recorded together in frames. This is also shown in FIG. 3. Each frame contains 16 blocks, composed of 14 data blocks and two special error correction blocks. The error correction blocks may be used by the tape drive to recover one or even two of the 14 data blocks in the frame in the event that the drive cannot read this block (or 2 blocks) correctly.

Therefore, along each track are recorded small groups of data blocks, which again are grouped into frames. Other tape systems and disk systems may use slightly different layouts. The common feature is that all systems group data into blocks, each being uniquely defined by some sort of numbering system. Also, because each block contains special control or check bytes (CRC), when reading a block the drive can determine whether the read operation was good.

DESCRIPTION OF THE PREFERRED EMBODIMENTS

Figure 1:
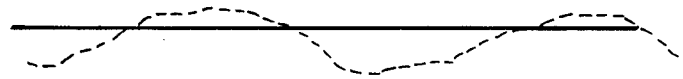
FIG. 1, as noted above, shows an ideal (nominal) track path in a solid line, and the actual path of a recorded track, shown by a dashed line, as arises in a conventional drive system, as noted above.
Figure 2:
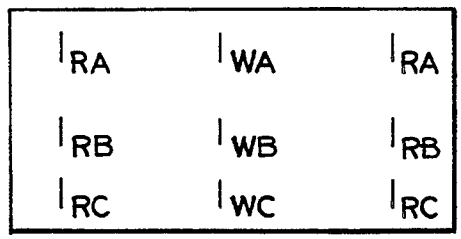
FIG. 2 is a schematic plan view of a conventional read head configuration for a ¼" tape cartridge drive designed for use with a servo system, as noted above.
Figure 3:
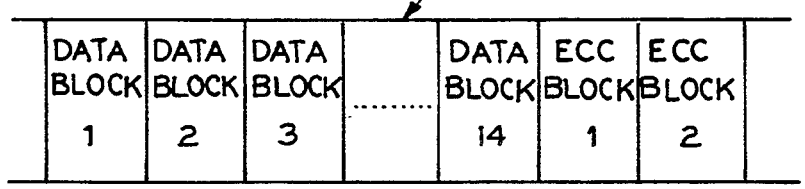
FIG. 3 is a schematic representation showing the layout of the frame and block format for the QIC-2GB tape standard, as noted above.
Figure 3:
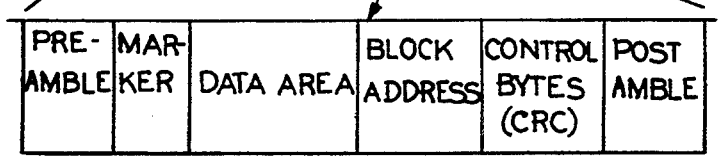
Figure 4:
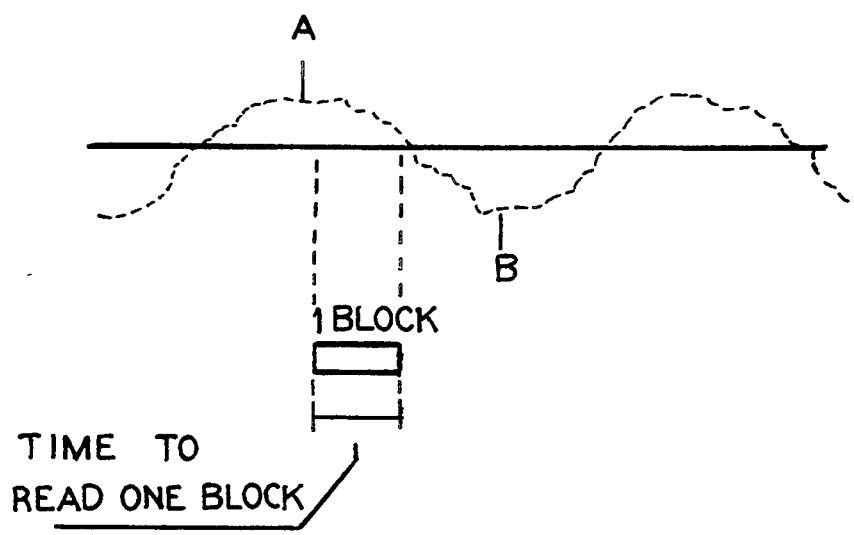
FIG. 4 schematically illustrates a principle on which the invention is based, that the time required for the storage media to move between maximum positions is assumed to be greater than the time required to read one data block.

The present invention is based upon the perception that the time to read one block shall be shorter than the typical time the tape needs to move from one maximum off center displacement position to the opposite one, as shown in FIG. 4. The area between respective lines parallel to the nominal path and passing through these maxima is the displacement area, i.e., the area or region within which a given track can be expected to be found.

In FIG. 4, it is assumed that the track to be read follows the line from A to B with A and B representing the opposite maximum displacement from the ideal track line. As already stated, the tape will need some time to move from displacement position A to displacement position B. This time is assumed to be larger than the time it takes to read a block as indicated in FIG. 4.

The actual time from A to B will vary depending upon the type of media used, speed, drive design etc. However, for a given design, the length of a block should be chosen so that the time to read it is always shorter than the time it takes to move from one maximum displacement of the track to the opposite one.

The invention is based on the principles outlined above and the use of a set of read heads, mounted very closely together. This is shown in FIG. 5.

Figure 5:
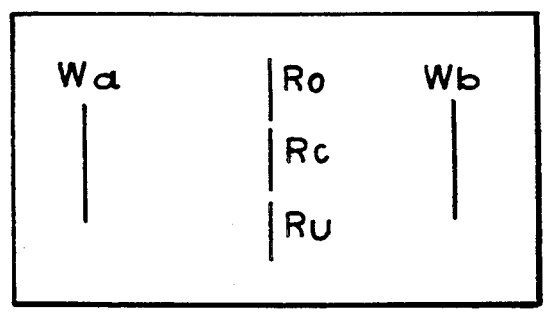
FIG. 5 shows a schematic representation of a head configuration constructed in accordance with the principles of the present invention, including both read and write elements.

The head configuration shown in FIG. 5 is one of several possible configurations. It shows the basic principle of the invention. A write gap (either Wa or Wb depending upon which direction the tape is moving) is used to write the track with no redundant (i.e. multiply written) blocks. The read gap which normally consists of one single gap, is replaced by two or more gaps placed very close to each other. FIG. 5 shows a drawing with 3 gaps, one center gap Rc, one upper gap marked Ro and one lower gap marked Ru. In conventional recordings without a servo system, the tolerances of the system would be designed so that the center read channel Rc always could read the recorded track. However, when the tracks become extremely narrow and are placed close to each other, there is a non-negligible probability that the center read gap may actually be fully or partly outside the recorded track, or even hitting a neighboring track.

In accordance with the principles of the present invention, the three heads cover such a wide area that at least one of them will always read the data correctly (but not necessarily the same read head all the time). Sometimes, two of the heads may read data correctly or in some cases all three will do so (depending upon design and tolerances). The important feature of the invention is to have a system which constantly monitors the reading of all the (three) read gaps and selects the data it wants from the read element and read channel supplying that data.

The actual configuration for the read elements may vary. FIGS. 6B-6F show various possibilities. Note that for most applications, the final head configuration will also include write element(s). For simplicity, FIGS. 6B-6F show only different variations of the read elements used to implement the invention.

The configuration of the read elements may be such that they cover a wider areas as the nominal tack width, or the same area as the normal track width or an area which is less than the normal track width (measured in a direction perpendicular to the nominal path). This will depend on the actual system implementation, especially the distance from one track to the neighbor track.

Figure 6A:
FIG. 6A is a schematic representation showing the conventional arrangement of a single read element relative to a recorded track.

FIG. 6A shows the recorded track and a conventional single read gap A.

Figure 6B:
FIGS. 6B–6F respectively show various embodiments of read element configurations, arranged in accordance with the principles of the present invention.

FIG. 6B shows two versions of the invention implemented by using two read elements side by side. Two elements B1 may be used covering an area wider than the track width, or two read elements B2 may be used covering less area than the track width. In both versions both read elements are able to read the contents of the track. However, as the relative position of the recorded track varies relative to the head gaps, only one of the read gaps may be able to read the track contents correctly at any given time.

Figure 6C:
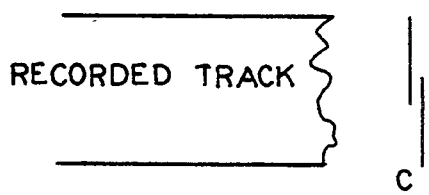

FIG. 6C shows the invention implemented by using two read elements C placed at a distance to each other and so that they partially overlap. The read electronics must be designed to cope with the difference in read timing between the two elements.

Figure 6D:
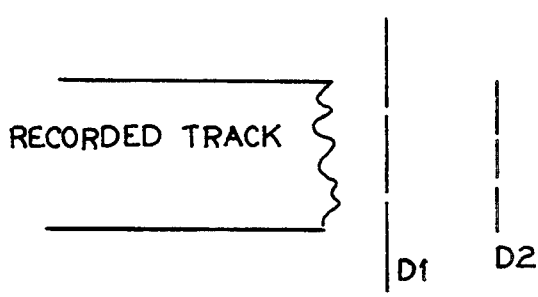

FIG. 6D shows the invention implemented by using three read elements, mounted side by side. Two versions are shown. Three elements D1 can be used covering an area wider than the track width or three elements D2 can be used, covering an area approximately, the same as the track width.

Figure 6E:
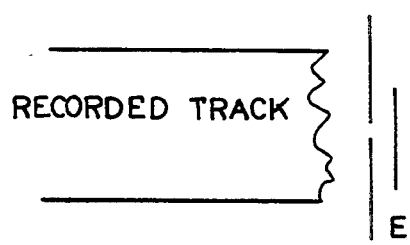

FIG. 6E shows also the invention implemented by using three read elements E, however, in this case the middle element is slightly offset with respect to the two other elements and the elements are also partially overlapping.

Figure 6F:
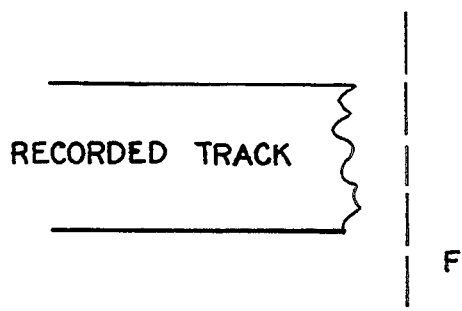

FIG. 6F shows the invention implemented with five read elements F.

The examples shown in FIGS. 6B-6F are not the only, read head configurations suitable for use in the invention. Those of skilled in the art will be able to arrange read elements in several other configurations. The important factor is to use at least two elements and arrange the corresponding electronics so that the read data from all (minimum of two) read channels are monitored and the correct data are continuously supplied to the rest of the drive electronics.

The read configurations shown in FIG. 6B-6F will normally be combined with write section(s) as shown in FIG. 5 to make a complete read/write head.

As shown in FIG. 5 and 6B-6F, the basic concept of this invention is to replace the common single read head with two or more read elements placed so that at least one of the elements always will cover the recorded track regardless of track position variations and at the same time have electronics in the drive which can distinguish between the read data from each element and continuously select the correct data for the read operation.

Figure 7:
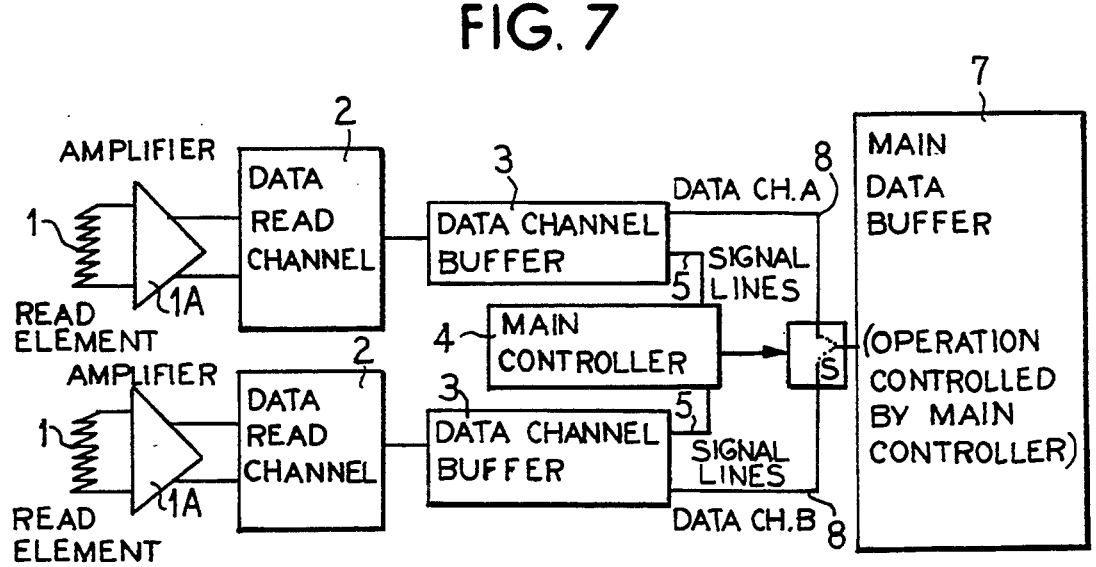
FIG. 7 is a schematic block diagram of the processing electronics for signals obtained using the read elements arranged and constructed in accordance with the principles of the present invention.

FIG. 7 shows a block diagram of the basic system of the invention. Each read element 1 is connected through an amplifier 1A to a data read channel 2 which in turn feeds the data to a digital channel buffer 3. Each read channel tries to read every block. Each time a new block has been read correctly into a buffer 3, the buffer 3 signals to the main controller 4 via a signal line 5 that a new block is available. The main controller 4 will then read out from the buffer 3 the address of the block. If this address corresponds to the next wanted block in the data sequence, the controller 4 will read the whole block from this buffer into its main memory 7 via a data line 8 and switch s operated by the controller 4. It will then wait for a signal from the same or one of the data buffers 3 for the next block in the sequence.

The main controller 4 is set up to be able to constantly, monitor the status of each read channel (through the signal lines 5). This will enable the controller 4 to determine whether a new block has been read into a channel buffer 3, whether it has been read correctly and whether the block has the correct block address. If the answers to all these questions are "yes," the main controller 4 then has the ability to transfer the data from the channel data buffer 3 to the main memory 7 through the switch s.

For implementation of the invention using more than two read elements, each additional read element will have the same read channel configuration as shown in FIG. 7.

Figure 8A:
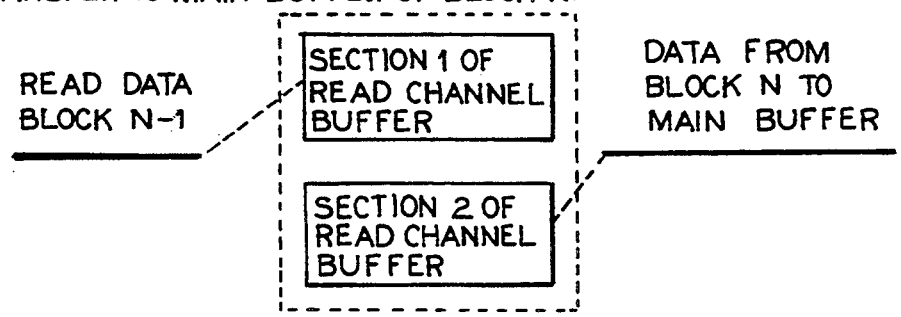
FIGS. 8A and 8B illustrate the operation of dual sections of a data channel buffer, in the circuit of FIG. 7.
Figure 8B:
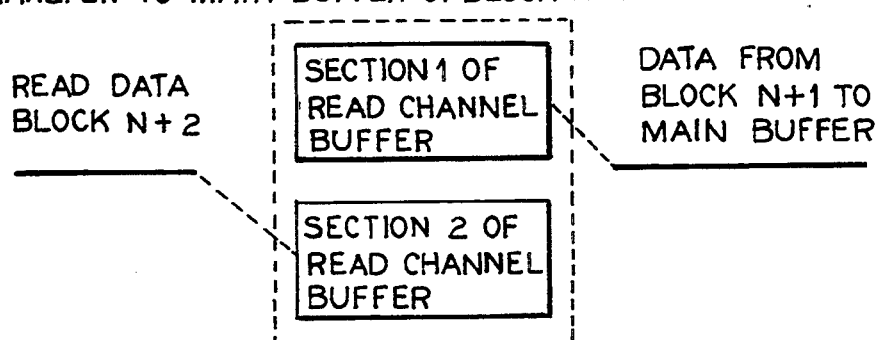

The read channel shown in FIG. 7 is somewhat simplified. Actual implementations may vary depending upon system requirements. For most systems, it may be necessary to design each channel data buffer 3 large enough to contain the data from two blocks. In this way, the main controller 4 may transfer data from one block (for example block N) to the main memory 7 while at the same time the channel is in the process of reading the contents of block N+1 into the channel buffer 3. This dual operation of every channel data buffer can easily be achieved by designing each channel data buffer as two parallel buffers as shown in FIGS. 8A and 8B. At the same time as block N is read out from section 2 of the channel buffer 3, block N+1 is loaded into section 1. Afterwards, block N+1 is read out from section 1 to the main memory 7 while data in block N+2 is loaded into section 2 of the channel buffer 3.

The system operation will be explained in more detail by the following example. It is assumed that the system shall read ten data blocks numbered from 100 to 109. It is also assumed that a system with two read elements will be used, referred to as read element A and read element B. It is further assumed that the read track position varies so that sometimes both channels are able to read the data, and sometimes only one channel can read. The operation may be described using the following chart, reading downwardly from the top of the chart:

| Block no. | Output available from channel A | Output available from channel B | Activity by the Main Controller System |
|---|---|---|---|
| None | Nothing | Nothing | Nothing, just waiting |
| 100 | Block no. 100 | Block no. 100 | Detects that both channel has read the wanted block. Transferring data from channel A to Main Buffer. Both channels are then told to read the next block. |
| 101 | Block no. 101 | Bad Block | Channel B failed to read the block. However, the data block is available from Channel A, so data is transferred from buffer A to Main Buffer. Both channels are told to read the next block. |
| 102 | Block no. 102 | Bad block | Same as for block no. 101 |
| 103 | Block no. 103 | Block no. 103 | Both channels contain wanted block. Main controller transfer the data block from channel A to the Main Buffer and tell both channels to read the next block. |
| 104 | Bad block | Block no. 104 | Channel B contains the wanted block while channel A failed. The main controller transfer the block from channel B to the main buffer and tell both channels to read the next block. |
| 105 | Bad block | Block no. 105 | Same as for block 104. |
| 106 | Bad block | Block no. 106 | Same as for block 105. |
| 107 | Bad block | Block no. 107 | Same as for block 106. |
| 108 | Block no. 108 | Bad block | Same procedure as for block 102. |
| 109 | Block no. 109 | Block no. 109 | Both channels contain wanted block. The main controller will transfer the data from buffer in channel A to the main buffer and then tell the channels to read the next block and so on . . . . |

The operation will in principle be the same if a read system with three or more elements is used. As was the case for the two read element system shown in FIG. 7, each read element in a system with three or more elements will be connected to its own independent read channel and block buffer. The main controller will constantly monitor the status from all channels, and will select each data block from the first channel making it available.

By this invention, it is possible to read data correctly from recorded tracks even in the case of systems where the track position may vary quite extensively from the nominal position at the time of recording. The details of the implementation of the head configuration and the rest of the system will depend upon particular system requirements. As already mentioned, this multiple head read redundancy system may also be used together with conventional servo track following systems; in which case the requirements placed on the servo operation may be reduced.

Although the use of the invention has been described herein as applied to magnetic recording, it will also be possible to use this invention in conjunction with optical recording systems. The magnetic read elements will then be replaced with optical read elements, configured so that they would be able to follow the optically recorded tracks in the way shown in FIGS. 6A–6F.

When the read elements are positioned with some distance apart (see, for example, FIG. 6E), some read elements may read a block earlier than other read elements. It is actually possible for a system that one read element could read block N+1 at the same time or even before another read element read block N. The main controller 4 may in this case be designed so that it stores each block in its correct position in the main memory, regardless of the sequence of the block read.

Although modifications and changes may be suggested by those skilled in the art, it is the intention of the inventors to embody within the patent warranted hereon all changes and modifications as reasonably and properly come within the scope of their contribution to the art.

I claim as my invention:

1. A method for reading data contained in a plurality of blocks arranged in a sequence in a plurality of tracks on a storage medium and each track moving along a nominal path, each track having a width substantially perpendicular to said nominal path, the movement of said storage medium causing said tracks to deviate over a displacement area approximately centered on said nominal path, said displacement area having respective off-center maxima on opposite sides of said nominal path and each block having length in a direction of said nominal path such that the time needed to read a block is less than the time required for a track to move between said maxima, said method comprising the steps of:

non-redundantly writing said blocks in said sequence in the tracks on said storage medium;

arranging a plurality of read elements relative to said storage medium so that each of said read elements covers at least a portion of the displacement area of a single track to be read, each of said read elements having a read channel uniquely associated therewith;

reading said data from said single track using all of said read elements simultaneously so that all of said read channels contain a data block read by the read element associated with that read channel;

monitoring each of said read channels to determine whether the respective data block contained therein was correctly read;

selecting a first-arriving, correctly-read block from among said read channels, which is next in said sequence following a previously selected block; and storing the selected block at a memory location correlated to its position in said sequence.

2. A method as claimed in claim 1 wherein each of said read channels includes a buffer memory, and wherein each buffer memory includes first and second memory sections, said method comprising the additional steps of:

alternatingly entering successive data blocks read by a read element associated with a read channel into said first and second memory sections of the buffer memory in that read channel; and reading a data block from one of said memory sections of said buffer memory in that read channel while a data block is being entered into the other of said memory sections of said buffer memory in that read channel.

3. A read system for a data storage and retrieval system, said data storage and retrieval system having a movable storage medium having a plurality of data blocks arranged thereon in an identifiable sequence in a plurality of tracks each moving along a nominal path, each track having a track width substantially perpendicular to said nominal path, the movement of said storage medium causing said tracks to deviate over a displacement area approximately centered on said nominal path, said displacement area having respective off-center maxima on opposite sides of said nominal path and each block having a length in a direction of said nominal path such that the time needed to read a block is less than the time required for a track to move between said maxima, said read system comprising:

- means for non-redundantly writing said blocks in said sequence in said tracks on said storage medium;
- a plurality of read elements arranged relative to said storage medium so that so that each of said read elements covers at least a portion of the displacement area of a single track to be read;
- a plurality of read channels respective uniquely associated with said read elements;
- all of said read elements being simultaneously used to read said blocks in said single track so that all of said read channels contain a data block read by the read element associated with that read channel;
- means for monitoring each of said read channels to determine whether the respective block contained therein was correctly read and for selecting a first-arriving, correctly-read block from among said read channels, which is next in said sequence following a previously selected block; and
- means for storing the selected block at a memory location correlated to its position in said sequence.

4. An apparatus as claimed in claim 3 wherein said plurality of read elements are disposed along a single line and cover, in combination, an extent greater than said track width.

5. An apparatus as claimed in claim 4 wherein said plurality of read elements is two.

6. An apparatus as claimed in claim 4 wherein said plurality of read elements is three.

7. An apparatus as claimed in claim 4 wherein said plurality of read elements is five.

8. An apparatus as claimed in claim 3 wherein said plurality of read elements are disposed along a single line and cover, in combination, an extent less than said track width.

9. An apparatus as claimed in claim 8 wherein said plurality of read elements is two.

10. An apparatus as claimed in claim 8 wherein said plurality of read elements is three.

11. An apparatus as claimed in claim 3 wherein said read elements are disposed along two lines extending perpendicularly to said nominal path with at least one read element in one of said lines overlapping at least one read element in the other of said lines.

12. An apparatus as claimed in claim 11 wherein said plurality of read elements is two, with one read element disposed in each of said lines.

13. An apparatus as claimed in claim 11 wherein said plurality of read elements is three, with two of said read elements disposed in one of said lines and one of said read elements disposed in the other of said lines.

14. An apparatus as claimed in claim 3 further comprising a buffer memory disposed in each of said read channels, each buffer memory having first and second memory sections, and each channel including means for alternatingly entering successive data blocks into said first and second memory sections and means for reading a data block from one of said memory sections while a data block is being read into the other of said memory sections.

15. An apparatus as claimed in claim 3 wherein said plurality of read elements are disposed on a read head, and wherein said read head also contains at least one write element.

16. An apparatus as claimed in claim 3 wherein said storage medium is a magnetic storage medium, and wherein said read elements are inductive gap read elements.

* * * * *